F. A. BULLINGTON.
MECHANISM FOR CONTROLLING AEROPLANES.
APPLICATION FILED MAY 1, 1912.
1,224,357.
Patented May 1, 1917.
3 SHEETS—SHEET 1.
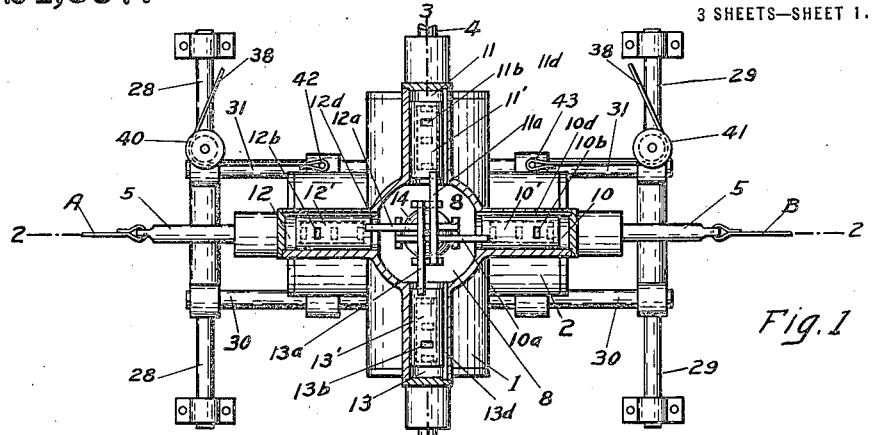
Fig. 1
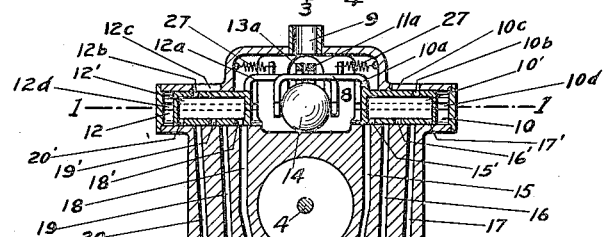
Fig. 2
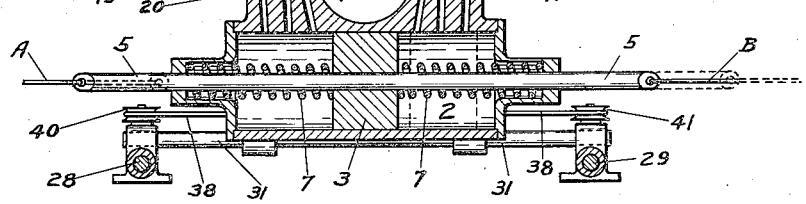
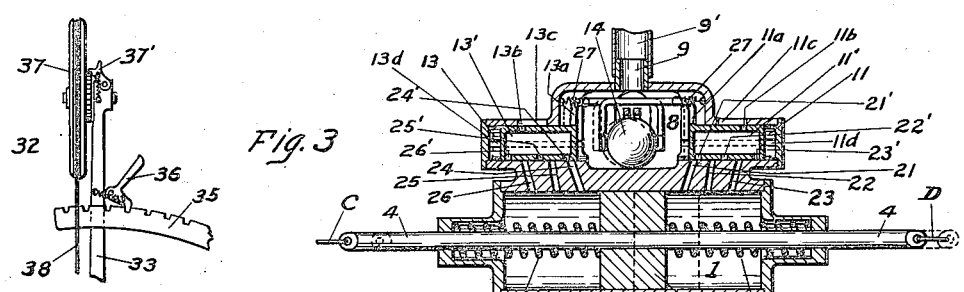
Fig. 3
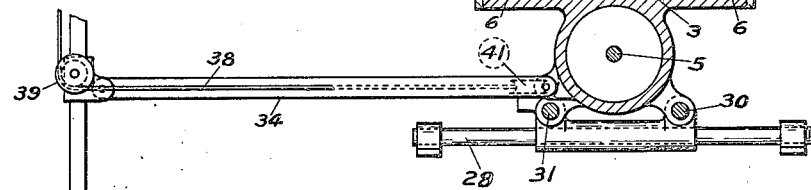
Witnesses.
Margarete Jaschim
[signature]
Inventor:
Frank A. Bullington
By [signature]
Attorney.

F. A. BULLINGTON.
MECHANISM FOR CONTROLLING AEROPLANES.
APPLICATION FILED MAY 1, 1912.

1,224,357.

Patented May 1, 1917.
3 SHEETS—SHEET 2.

Witnesses.
Margarete Jaschina
Daniel F. Owers

Inventor.
Frank A. Bullington
By
Attorney.

F. A. BULLINGTON.
MECHANISM FOR CONTROLLING AEROPLANES.
APPLICATION FILED MAY 1, 1912.
1,224,357.
Patented May 1, 1917.
3 SHEETS—SHEET 3.
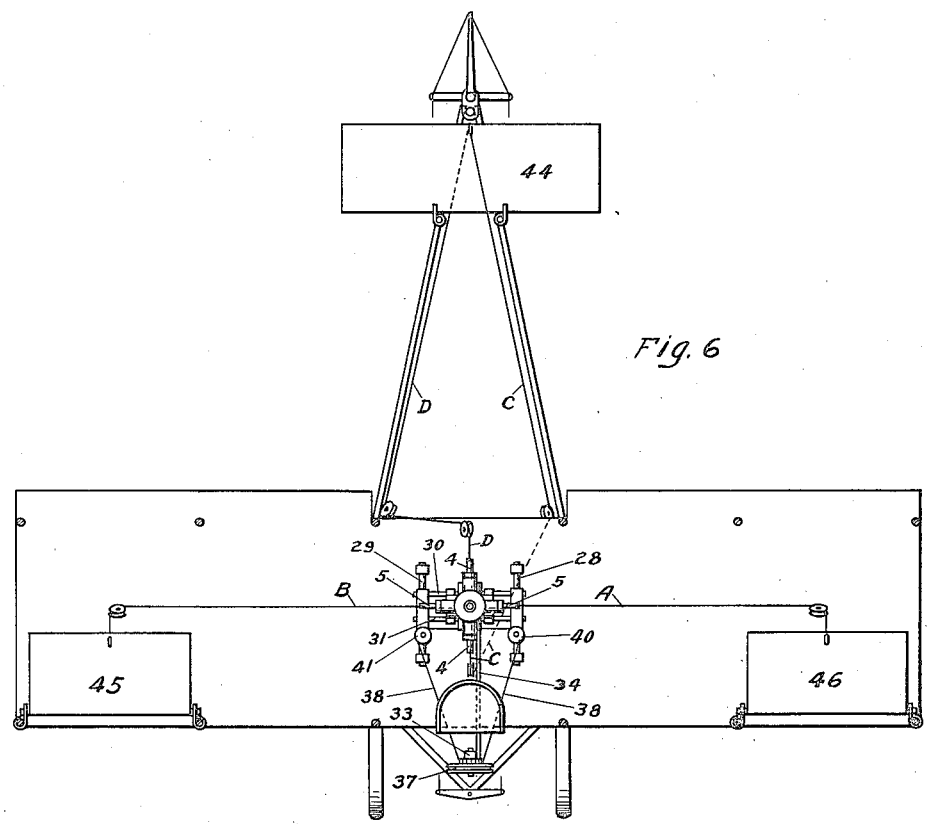
Fig. 6
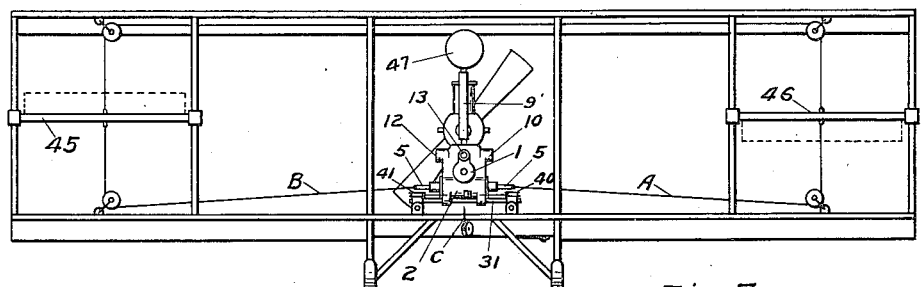
Fig. 7

UNITED STATES PATENT OFFICE.

FRANK A. BULLINGTON, OF PORTLAND, OREGON.

MECHANISM FOR CONTROLLING AEROPLANES.

1,224,357.          Specification of Letters Patent.         Patented May 1, 1917.

Application filed May 1, 1912. Serial No. 694,414.

*To all whom it may concern:*

Be it known that I, FRANK A. BULLINGTON, a citizen of the United States, residing in the city of Portland, county of Multnomah and State of Oregon, have invented certain new and useful Improvements in Mechanisms for Controlling Aeroplanes, of which the following is a specification.

My invention relates to mechanism for controlling aeroplanes, and more particularly to mechanism by means of which the equilibrium of an aeroplane which has been disturbed or unbalanced is automatically and promptly restored during flight, no matter what may have been the disturbing element.

Among the salient objects of the invention are—

To provide a mechanism of the character referred to which is automatic in its action, and which is sufficiently sensitive in its operation to respond promptly to every movement of an aeroplane away from a balanced flying position; to provide a mechanism of the character referred to which can also be manually operated by the pilot in controlling his aeroplane, and for manually moving the various parts or planes for the purpose of changing the direction of travel.

Broadly considered, therefore, my invention comprises one or more operating cylinders, a source of operating fluid under pressure, pistons moving in said cylinders and connected to the parts to be moved, and a gravity-actuated element movable freely with the bodily movement of the aeroplane, for controlling the admission of said operating fluid to said operating cylinders.

In the preferred construction or embodiment of the invention, I use air under pressure in the cylinder for moving the ailerons, balancing planes, lifting plane, or other parts, to be manipulated in the control of an aeroplane, and I prefer to use a round ball, or a cylindrical member, as such gravity-actuated element, arranged to roll freely upon a smooth surface, with suitable connections or engaging parts for operating valves which control the admission of the air under pressure to said cylinders. I do not, however, limit my invention to the use of a rolling element, knowing that a supported swinging element will work.

In order that others may more clearly understand my invention, I have shown in the accompanying three sheets of drawings for purpose of illustration, two embodiments of the invention which I will now describe. In the drawings,—

Figure 1 is a top plan view of one form of a controlling mechanism embodying my invention, partly in section, as on line 1—1 of Fig. 2;

Fig. 2 is a vertical sectional view taken on line 2—2 of Fig. 1;

Fig. 3 is a vertical sectional view taken in the opposite direction, as on line 3—3 of Fig. 1;

Fig. 6 is a top plan view thereof;

Fig. 7 is a front view thereof;

Figure 5:
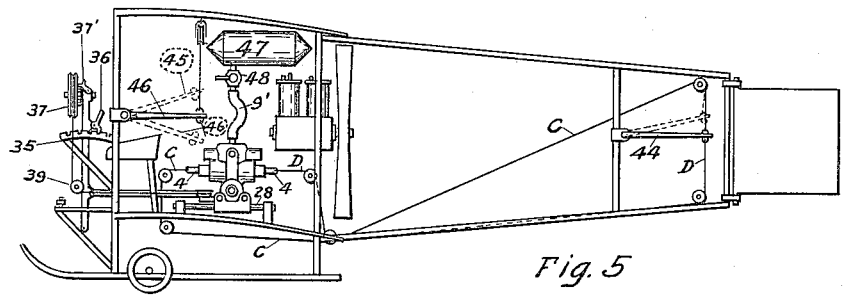
Fig. 5 is a side elevation of a biplane with the described embodiment of the invention applied thereto.

Referring now to Figs. 1, 2, and 3, the controlling mechanism comprises a body or casing having therein two cylinders, 1 and 2, positioned one above the other and standing at right angles to each other. Said cylinders are provided with pistons, as 3, and piston rods, as 4—5. Said piston rods extend from the pistons in opposite directions and project from the opposite ends of said cylinders 1 and 2. Said piston rods are adapted to have attached to their opposite ends operating cables as A—B and C—D, extended to the different parts to be manipulated, and hereinafter more particularly referred to. Mounted upon said piston rods 4 and 5, within said cylinders, and at the opposite sides of the pistons, are coiled springs 6—6 and 7—7, which operate to center said pistons and piston rods within said cylinders, in the absence of pressure within the cylinders.

The upper part of the cylinder body or casing is an air chamber, 8, for receiving the air under pressure through a supply port 9. Forming a part of said air chamber are four extensions, or valve chambers, as 10, 11, 12, and 13, within each of which is a valve member, as 10′, 11′, 12′, and 13′, having operating arms or fingers, designated, respectively, 10$^a$, 11$^a$, 12$^a$, 13$^a$, overlying an operating ball, 14, which constitutes one form of gravity-actuated element, and is adapted to roll freely in any direction upon a smooth bottom of the air chamber 8, and to move the valve members 10', 11', 12', and 13', by means of said operating fingers 10$^a$, 11$^a$, 12$^a$, and 13$^a$. Leading from said air chamber 8, and from the valve chambers 10 and 12 thereof into cylinder 2, are cylinder ports, 15, 16, and 17, at one side, and 18, 19, and 20, at the opposite side, Fig. 2. These are adapted to be controlled by the valve members 10', and 12'. Referring now to Fig. 3, similar cylinder ports 21, 22, and 23 extend from the valve chamber 11 to cylinder 1, and on the opposite side, cylinder ports 24, 25, and 26, extend from the valve chamber 13, to said cylinder 1 at the opposite side of the piston 3. The valve members 10', 11', 12', and 13' are hollow and are provided in their upper sides with exhaust outlets, as 10$^b$, 11$^b$, 12$^b$, and 13$^b$, adapted to register with outlet openings 10$^c$, 11$^c$, 12$^c$, and 13$^c$, in the upper side of the valve chambers 10, 11, 12, and 13. Said valve members are also provided upon their under sides, adapted to move into register with their respective cylinder ports 15, 16, and 17; 18, 19, and 20; 21, 22, and 23; or 24, 25, and 26; with ports 15', 16', and 17'; 18', 19', and 20'; 21', 22, and 23'; and 24', 25', and 26', respectively, arranged, however, so that only one of the ports of each valve can be moved into register with one of the corresponding cylinder ports at the same time. Valve chambers 10, 11, 12, and 13 are provided with bypasses 10$^d$, 11$^d$, 12$^d$, and 13$^d$, so as to permit the free flow of air between valve chambers, around the valve members, and said air chamber 8, as the valve members are moved therein.

When the controlling mechanism just described rests in a horizontal position, as indicated in Figs. 1, 2, and 3, and the pistons stand in the middle or center positions of their respective cylinders, all of the cylinder ports 15 to 26, inclusive, are closed by the valve members 10', 11', 12', and 13'. As a means for moving and holding said valve members in their normal or balanced positions when the controlling mechanism and the aeroplane are resting in a horizontal position, I provide coiled springs, as 27, one for each of the fingers, or arms 10$^a$, 11$^a$, 12$^a$, and 13$^a$, which springs are attached one to each of said fingers or arms at one end, and to the inside of the air chamber casing 8 at its other end, as indicated.

I mount my controlling mechanism upon an aeroplane so that it can be moved bodily in four different directions. I do this by mounting directly upon the frame of the aeroplane, two supporting shafts, or bars, 28—29, upon which the controlling mechanism is mounted, as indicated, Figs. 1, 2, and 3. Extending between these two supporting shafts or bars 28—29, are two transversely extending supporting shafts or bars 30 and 31, themselves slidably connected at their ends with the members 28 and 29. Slidably mounted upon said shafts or members 30 and 31, is the controlling mechanism, movable bodily in four different directions. This is accomplished by means of a combination wheel and lever, designated as a whole, 32. The lever 33 is pivotally connected at its lower end to the frame of the aeroplane, and by means of a connecting link 34, it is connected to the controlling mechanism, so that by moving said lever forwardly or backwardly, the controlling mechanism is moved bodily upon the supporting shafts, or bars, 28—29. As a means for holding said levers in various positions, I have provided a rack 35, with dog or pawl 36. Mounted upon the upper end of said lever 33, and serving as a hand grip therefor, is a wheel 37, over which runs an operating cable 38, extending downwardly and around pulleys as 39—39, on opposite sides thereof, and thence backwardly and around pulleys 40—41, mounted at the opposite ends of the supporting shaft 31, Fig. 1, and extended thence to points of attachment at 42—43, upon the lower portion of the controlling mechanism. By means of this cable 38, and the controlling hand wheel 37, said controlling mechanism is moved bodily upon the supporting shafts or members 30—31. Thus the pilot, with his hands upon the wheel 37, can move the lever 33 forwardly or backwardly for the purpose of moving the controlling mechanism bodily upon supporting shafts 28—29, or by turning said wheel 37 in either direction, can move said controlling mechanism bodily in either direction upon the supporting shafts, or bars, 30—31, and in a direction at right angles to the movement upon shafts 28—29. A pawl and ratchet wheel, at 37', operates to hold said hand wheel 37 in the different positions to which it is turned.

It will thus be understood that when said controlling mechanism is moved bodily, in either direction by manual operation of the pilot, the piston rods, which are attached to the different operating cables A—B, and C—D, are also moved, and through said cables this bodily movement operates to change the positions of the movable parts or planes controlling the aeroplane. If by operation of the gravity-actuated element, any of the valve members are moved which control communication between the air chamber 8, and cylinders 1—2, the pistons and piston rods will be moved within the cylinders, and the operating cables will be thus moved through the operation of the pistons within cylinder, instead of by the manual bodily movement of the controlling mechanism, as above described. The movement of the operating cables and of the planes or parts to which they are attached is the same when said cables are moved by the manual bodily movement of the whole controlling mechanism, as it is when accomplished by the movement of the pistons and piston rods within their respective cylinders.

Referring now to Figs. 5, 6, and 7, I have shown one form of biplane with my controlling mechanism mounted therein. This biplane is provided rearwardly with a lifting plane 44, pivotally attached at its forward edge to the frame of the biplane, while to its rearward edge are attached the operating cables C D, which extend to, and over suitable pulleys as indicated, and are connected, respectively, with the opposite ends of the piston rod 4, in cylinder 1. Thus when piston rod 4, with its piston 3, is moved in either direction within the cylinder 1, or when the entire controlling mechanism is moved bodily upon supporting shafts 28 and 29, by means of the lever, 33, said lifting plane 44 is raised or lowered at its rearward edge, depending, of course, upon which direction the piston rod 4 is moved. Mounted between the planes of said biplane and at opposite ends thereof, are two ailerons, or balancing planes, 45—46, pivotally attached at their forward edges to the frame of the biplane, as indicated clearly in Figs. 6 and 7, and having attached to their rearward edges, from above and from below, the operating cables A—B, which are attached to the opposite ends of the piston rod 5, in cylinder 2. Thus by the movement of the piston rod 5 in either direction, or by the bodily movement of the controlling mechanism upon the supporting shafts 30—31, through said cables A—B the ailerons or balancing planes 45—46 are raised or lowered, respectively, at their rearward edges, depending, of course, upon which direction said piston rod is moved.

An air tank or reservoir, 47, for compressed air for operating the pistons, is mounted in the biplane and is connected to the air chamber 8 through a flexible tube 9'. As a means for cutting off the air supply from said reservoir to the air chamber 8, I provide a valve cock 48.

Figure 9:
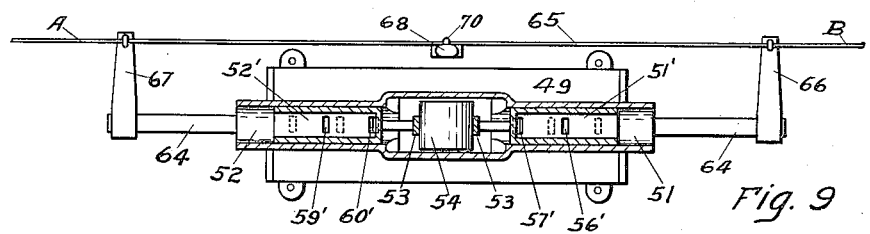
Fig. 9 is a horizontal sectional view thereof taken on line 9—9 of Fig. 8.
Figure 8:
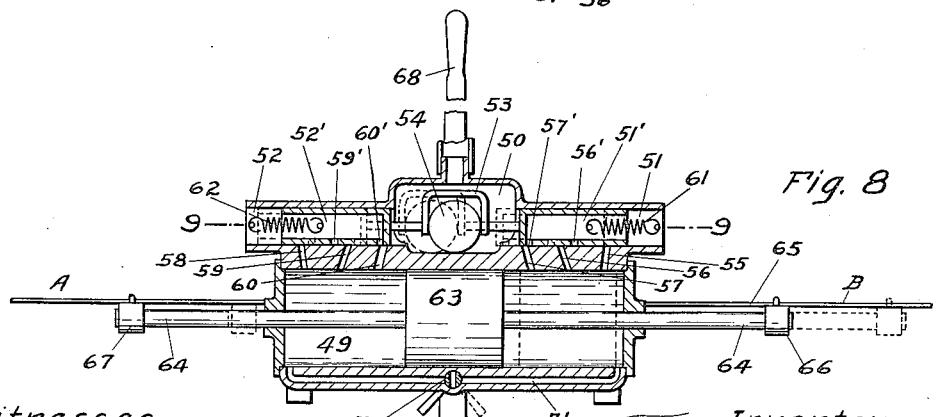
Fig. 8 is a longitudinal sectional view of a modified form of the invention, only one cylinder being shown.

Referring now to Figs. 8 and 9 I have shown a longitudinal sectional view, and a horizontal sectional view, respectively, of a modified form of the invention. In this embodiment I have shown a single cylinder with piston rod, and intend it to be used preferably for the lateral balance only; that is, the piston rod will be connected to ailerons, or balancing planes. Instead of a ball, I have used a cylindrical member, as the gravity-actuated element. I have also provided means for manual operation, as well as for the automatic control. In Figs. 8 and 9, the cylinder is designated 49, the air chamber 50, the valve chambers 51—52, and the valve members 51' and 52', said valve members being connected together by means of an arch 53, adapted to rest over, and be operated by, the gravity-actuated cylindrical member 54. In this form, said valve members are open at their outer ends, instead of being closed, as in the other embodiment. Cylinder ports 55, 56, and 57, and 58, 59, and 60, connect the cylinder 49 with the valve chambers 51 and 52. The valve members 51' and 52' are provided in their lower sides with ports 56' and 57', and 59' and 60', adapted to be moved into register with the respective cylinder ports, 56—57 and 59—60. As a means for returning the gravity-actuated member 54, and the valve members 51' and 52' to their normal centered positions as the aeroplane is restored to a horizontal, or balanced position, coiled springs 61 and 62 are attached to the walls of the valve chambers as indicated. These springs are opposed to each other and are intended to overcome the friction between the moving parts and to move them to a centered position. The piston 63 in this embodiment of the invention is also provided with a piston rod 64, extending in both directions, and adapted to be attached at its opposite ends to an operating cable 65, corresponding to the cable A—B, in the other embodiment described, by means of arms 66 and 67, so that as the piston is moved in either direction, said cable is also drawn therewith. In order to move the piston bodily and therefore provide for manual operation of said operating cable 65, I have provided a hand lever 68, to be pivotally connected at 69 to the frame of the aeroplane. This lever is connected at 70 to said operating cable 65, whereby the movement of the lever 68, operates to move the cable and also the piston rod therewith. I have provided a bypass 71 between the opposite ends of the cylinder 49, with a control cock 72, adapted to be manually operated when it is desired to move the piston, the piston rod and the cable by hand. This bypass permits the air from one end of the cylinder to pass to the opposite end thereof as the piston, piston rod and cable are moved manually by the hand lever 68.

It will thus be seen that in this embodiment of the invention I have provided a single cylinder adapted to be rigidly mounted in the aeroplane for automatically, and also manually, controlling the ailerons or balancing planes of an aeroplane.

One feature of importance in connection with the valve members controlling the cylinder ports and the movement of the pistons, is a construction wherein the movement of the gravity-actuated element which moves a valve member to open a cylinder port for the admission of air under pressure to one end of a cylinder, also operates a companion valve member which controls the cylinder ports on the opposite side of the piston so as to open and close said ports successively as exhaust ports. This progressive or limited exhaust prevents a full movement of the piston immediately upon the admission of air under pressure to one end of the cylinder, unless the disturbance which has unbalanced the aeroplane is sufficient to cause the gravity-actuated element to move far enough to open the last port on the exhaust side, which then permits of a full movement of the piston within the cylinder. For example, supposing the aeroplane has been tilted slightly to one side so as to cause the gravity-actuated member 14 to move slightly to one side, as indicated in dotted lines, Fig. 3. The valve member 13' is thereby moved to the left sufficiently to open cylinder port 24, for the admission of air under pressure from the air chamber to the left hand end of cylinder 1, thereby moving the piston 3 to the right, as indicated by the dotted lines of Fig. 3. This movement of the gravity-actuated element 14 also moves the companion valve member 11' sufficiently to bring the port 21' in the under side thereof, into register with cylinder port 21, thus providing an exhaust from the opposite end of the cylinder through said valve member 11' and the outlet ports 11ᵇ and 11ᶜ. This exhaust, however, through ports 21 and 21' is cut off by the piston itself, whereby the piston cannot move farther, for example, than indicated by the dotted lines, Fig. 3, unless the gravity-actuated member 14 is moved still farther to the left, so as to move the valve member 11' to the left far enough to bring ports 22 and 22' into register with each other for a further exhaust from the right hand end of cylinder 1, thereby permitting of a further movement of the piston and the operating cables C—D. A still further movement of the gravity-actuated element, and of the valve member 11', brings into register with each other ports 23 and 23', and opens the last exhaust and permits the piston to be moved to the extreme end of the cylinder, and to move therewith the operating cables and the parts connected thereto accordingly.

Figure 4:
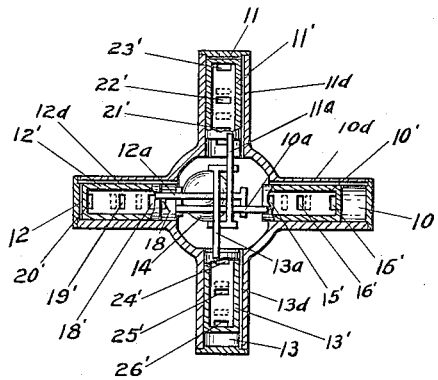
Fig. 4 is a horizontal sectional view through the valve chambers showing the action of the gravity-actuated element.

If after any movement of the piston and of the operating cables C—D. the aeroplane is righted and the gravity-actuated member 14 and the valve members are again centered, the inlet 24 is cut off by the valve member 13' from communication with the air chamber 8, and becomes an exhaust port in register with the port 24' opening through said valve member 13' and the ports 13ᵇ and 13ᶜ. In Fig. 4, the gravity-actuated element 14 has not only moved to one side, that is, in one direction, but has also been moved forwardly slightly, assuming the top or upwardly projecting valve member 11, to be "forwardly." This movement causes valve members 10' and 12' to be moved to the left, and valve members 11' and 13' to be moved forwardly, as indicated in Fig. 4. In this position, both cylinders are brought into operation, in the manner above described, and the operating cables A—B and C—D are moved with the pistons, in the respective cylinders, and therewith, in this form, are moved the lifting plane 44, and the ailerons 45 and 46.

While I have shown and described two embodiments of the invention, and also one application thereof to aeroplanes, I do not limit the invention to the particular showing made for purpose of illustration, except as I may be limited by the hereto appended claims, broadly interpreted.

I claim:

1. A controlling mechanism for flying machines comprising a cylinder with piston working therein, a source of operating fluid under pressure with valve-controlled connections to said cylinder, a round weight mounted to roll freely upon a supporting surface, and connecting means having direct connection with said round weight and with said valve, whereby any movement of said weight in either direction simultaneously moves said valve.

2. A controlling mechanism for flying machines comprising in combination therewith, a cylinder, a piston working therein, operating connections from said piston to a movable part of said flying machine, a source of operating fluid under pressure, means providing communicating passageways to said cylinder, valves for gradually opening and closing said passageways to said cylinder, a round weight mounted to roll freely upon a supporting surface and operating connecting members extending from said weight to said valves, whereby to positively move said valves with any movement of said weight.

3. In combination with an aeroplane having movable ailerons, elevating planes, and the like, of one or more cylinders with pistons, operating connections between said pistons and said movable parts, a source of operating fluid under pressure, a receiving chamber with communicating connections to said cylinders, controlling devices for said communicating connections, a ball weight mounted to roll freely upon a plane surface, and having direct positive connection with said controlling devices for automatically actuating the same.

4. A controlling mechanism for aeroplanes, comprising a cylinder and piston movably mounted in said aeroplane, operating connections between said cylinder and piston and a movable part of said aeroplane, a source of operating fluid under pressure with communicating connections to said cylinder, a controlling device for said communicating connections, a gravity-actuated element mounted to move freely for automatically actuating said controlling device, and means for manually moving said cylinder and piston bodily in a straight line at will, for the purpose indicated.

5. In combination with an aeroplane having movable ailerons, elevating planes and the like, of movably mounted operating cylinders with pistons, operating connections between said cylinders and pistons and said movable parts, a source of operating fluid under pressure with communicating connections to said cylinders, controlling devices for said communicating connections, a gravity-actuated element movable freely for automatically actuating said controlling devices, and means for manually moving said cylinders and pistons bodily in a straight line, whereby to manually manipulate the movable parts of said aeroplane at will.

6. In a controlling mechanism for aeroplanes and the like, in combination with the movable parts thereof, of one or more cylinders with pistons, operating connections therefrom to said movable parts, a source of operating fluid under pressure with communicating connections with said cylinders, a controlling mechanism, with valve members interposed between said source of supply and said cylinders for regulating the supply to and the exhaust from said cylinders, and a gravity actuated element movable freely upon a smooth surface with direct positive connections to said valve members for automatically actuating said controlling mechanism.

7. In a controlling mechanism for aeroplanes and the like, in combination with the movable parts thereof, of one or more cylinders with pistons movably mounted in said aeroplane, whereby to be moved bodily, operating connections therefrom to said movable parts of the aeroplane, a source of operating fluid under pressure with communicating connections with said cylinder, a controlling mechanism interposed between said source of supply and said cylinders, a gravity-actuated element movable freely for automatically actuating said controlling mechanism and means for manually moving said cylinders and pistons bodily in a straight line, whereby to manually manipulate the movable parts of said aeroplane at will.

8. In a controlling mechanism of the character referred to, a cylinder with piston therein, a casing or body providing an air chamber and valve chambers, each valve chamber having a plurality of ports communicating with said cylinder, valve members for said valve chambers controlling said communicating ports and having exhaust ports therein, and means for moving said valve members, whereby to open an inlet port to one end of said cylinder and to successively open and close exhaust ports from the opposite end thereof.

9. In a controlling mechanism of the character referred to, a cylinder with piston therein, a casing or body providing an air chamber and valve chambers, each having a plurality of ports communicating with said cylinder, valve members for said valve chambers controlling said communicating ports and having exhaust ports therein, and a gravity-actuated element rolling freely upon a smooth surface and adapted to move said valve members, whereby to open an inlet port to one end of said cylinder and to successively open and close the exhaust ports from the opposite end thereof.

10. In a controlling mechanism of the character referred to, a cylinder with piston therein, a casing or body providing an air chamber and valve chambers with communicating ports to said cylinder arranged in series, valve members for said valve chambers controlling said communicating ports and having exhaust ports therein, means for moving said valve members, whereby to open an inlet port to one end of said cylinder and to successively open and close different exhaust ports from the opposite end of said cylinder, for the purpose indicated.

11. In a controlling mechanism of the character referred to, a cylinder with piston therein, a casing or body providing an air chamber and valve chambers with communicating ports to said cylinder arranged in series, valve members for said valve chambers controlling said communicating ports and having exhaust ports therein, a gravity-actuated element movable freely and adapted to move said valve members, whereby to open an inlet port to one end of said cylinder, and means whereby said valve members and gravity-actuated element successively open and close different exhaust ports from the opposite end of said cylinder, for the purpose indicated.

12. In a controlling mechanism for aeroplanes, in combination, a cylinder with piston, a source of operating fluid under pressure with valve-controlled connections to said cylinder, operating connections between said piston and a movable part of the aeroplane, a detached, gravity-actuated element adapted to roll freely upon a surface, and a part adapted to be engaged continuously by said rolling element whereby to actuate the valve-controlled connections to said cylinder.

13. A controlling mechanism for aeroplanes comprising in combination with the movable parts of the aeroplane, of one or more cylinders with pistons, operating connections therefrom to said movable parts of said aeroplane, a source of operating fluid under pressure, supply connections therefrom to said cylinders with valve mechanisms for controlling admission of the operating fluid to said cylinders, a rolling element mounted upon a smooth surface and adapted to roll by gravity for actuating said controlling mechanism, and operating fingers from said controlling mechanism and hooked to said rolling element.

14. In a controlling mechanism for aeroplanes, the combination with the movable planes or parts thereof, of one or more cylinders and pistons, operating connections therefrom to said movable parts, a source of operating fluid under pressure, supply connections from said source of fluid supply to said cylinders, valve mechanisms for controlling the admission of the operating fluid to said cylinders, a spherical, gravity-actuated element adapted to roll freely and operating fingers in direct hooked engagement with said gravity actuated element to automatically actuate said valve mechanisms.

15. In a device of the character referred to, a cylinder with piston to move therein, a casing providing an air chamber and valve chambers with ports, arranged in series, leading to opposite ends of said cylinder, valve members for said valve chambers, adapted to control said cylinder ports, said valve members being provided with ports therein, and adapted to be moved to successively open and close the ports of one chamber as exhaust ports, and to uncover a port of an opposite valve chamber as an inlet or supply port, substantially as described.

16. In a controlling mechanism of the character referred to, in combination, movable parts, cylinders with pistons connected to said movable parts, a source of operating fluid under pressure with supply connections to said cylinders, valves interposed between said cylinders and said supply connections, and a rolling weight upon a smooth surface, adapted to roll by gravity thereupon, and connecting fingers from said valves hooked directly to said rolling weight, whereby the movement of the latter positively operates the former.

17. In a controlling mechanism for aeroplanes, in combination with movable parts thereof, cylinders with pistons connected to said movable parts, a source of operating fluid under pressure with supply connections to said cylinders, valves controlling said supply connections, springs operating on said valves, and a rolling weight upon a smooth surface with connecting fingers from said valves hooked directly to said weight, whereby to positively move said valves therewith.

18. In a device of the character referred to, in combination, a cylinder with piston working therein, valve chambers with valve members therein with a series of communicating ports therefrom to said cylinder, said valve members having ports therein and arranged to successively open and close the ports to one end of said cylinder for exhaust purposes, and a gravity actuated element for successively moving said valve members.

19. In a device of the character referred to, in combination, a cylinder and piston working therein, a source of operating fluid under pressure, a receiving or supply chamber with valve chambers communicating therewith and having series of communicating ports to each end of said cylinder, valve members, with ports therein, for said valve chambers, said valve ports being arranged to be moved successively into register with the communicating ports to said cylinders whereby to successively open them for exhaust purposes, and a gravity-actuated element for moving said valve members.

20. In a controlling device for aeroplanes, in combination with movable parts thereof, a cylinder movably mounted and connected to some of said parts, means for moving said cylinder bodily in a straight line in opposite directions, a piston therein connected with other movable parts of said aeroplane, and a source of operating fluid under pressure with connections therefrom to said cylinder, substantially as described.

21. Means for controlling movable parts of a flying machine comprising a round weight supported upon a smooth surface and operating connecting fingers hooked over said weight in direct positive connection, whereby movement of the weight moves the connecting fingers.

FRANK A. BULLINGTON.

In presence of—
G. A. NICHOLS,
MARGARETE JASCHIUA.